United States Patent
Daigle

[11] Patent Number: 5,803,519
[45] Date of Patent: Sep. 8, 1998

[54] ROD AND REEL CADDY

[76] Inventor: Francis P. Daigle, 220 Clara Dr., Slidell, La. 70458

[21] Appl. No.: 805,421

[22] Filed: Feb. 25, 1997

[51] Int. Cl.[6] ............................. A01K 97/10; B65D 71/00
[52] U.S. Cl. ........................... 294/159; 211/70.8; 294/169
[58] Field of Search ................................... 294/143, 146, 294/159, 161, 166, 169; 43/21.2; 206/315.11; 211/70.8, 195, 198; 224/922

[56] References Cited

U.S. PATENT DOCUMENTS

| | | | |
|---|---|---|---|
| 4,133,131 | 1/1979 | Davy | 211/70.8 X |
| 4,424,907 | 1/1984 | Robb | 211/70.8 |
| 4,479,322 | 10/1984 | Koppel | 43/21.2 |
| 4,628,628 | 12/1986 | Burgin et al. | 43/26 |
| 4,696,122 | 9/1987 | Van Der Zyl | 294/159 X |
| 4,779,914 | 10/1988 | Friedline | 294/143 |
| 4,953,318 | 9/1990 | Vasseur | 43/21.2 |
| 5,071,048 | 12/1991 | Price et al. | 224/207 |
| 5,094,351 | 3/1992 | Barney | 211/70.8 |

Primary Examiner—Johnny D. Cherry
Attorney, Agent, or Firm—Joseph N. Breaux

[57] ABSTRACT

A fishing rod and reel caddy including a folding frame structure including a first U-shaped assembly and a second U-shaped assembly pivotally connected to the first U-shaped assembly. The first U-shaped assembly has a first central bar having a first pair of parallel bars extending from the ends thereof. A heel attachment bar having a plurality of rod heel receiving tubes is connected between the two parallel bars. The second U-shaped assembly has a second central bar having a second pair of parallel bars extending from the ends thereof. Each of the second pair of parallel bars includes a length adjustment mechanism for allowing a user to adjust the lengths thereof. A rod gripping bar is attached between and perpendicular to the second pair of adjustable length parallel bars. The rod gripping bar has a plurality of rod gripping units secured along the length thereof for gripping the tip end of a fishing rod. The first and second U-shaped assemblies are pivotally connected by a pair of pivot pins at the far ends of the first and second pairs of parallel bars. The first and second U-shaped assemblies are lockable in a fixed position with respect to one another by a pair of tubular locking members slidable over each of the pivot connections formed by the pair of pivot pins.

20 Claims, 3 Drawing Sheets

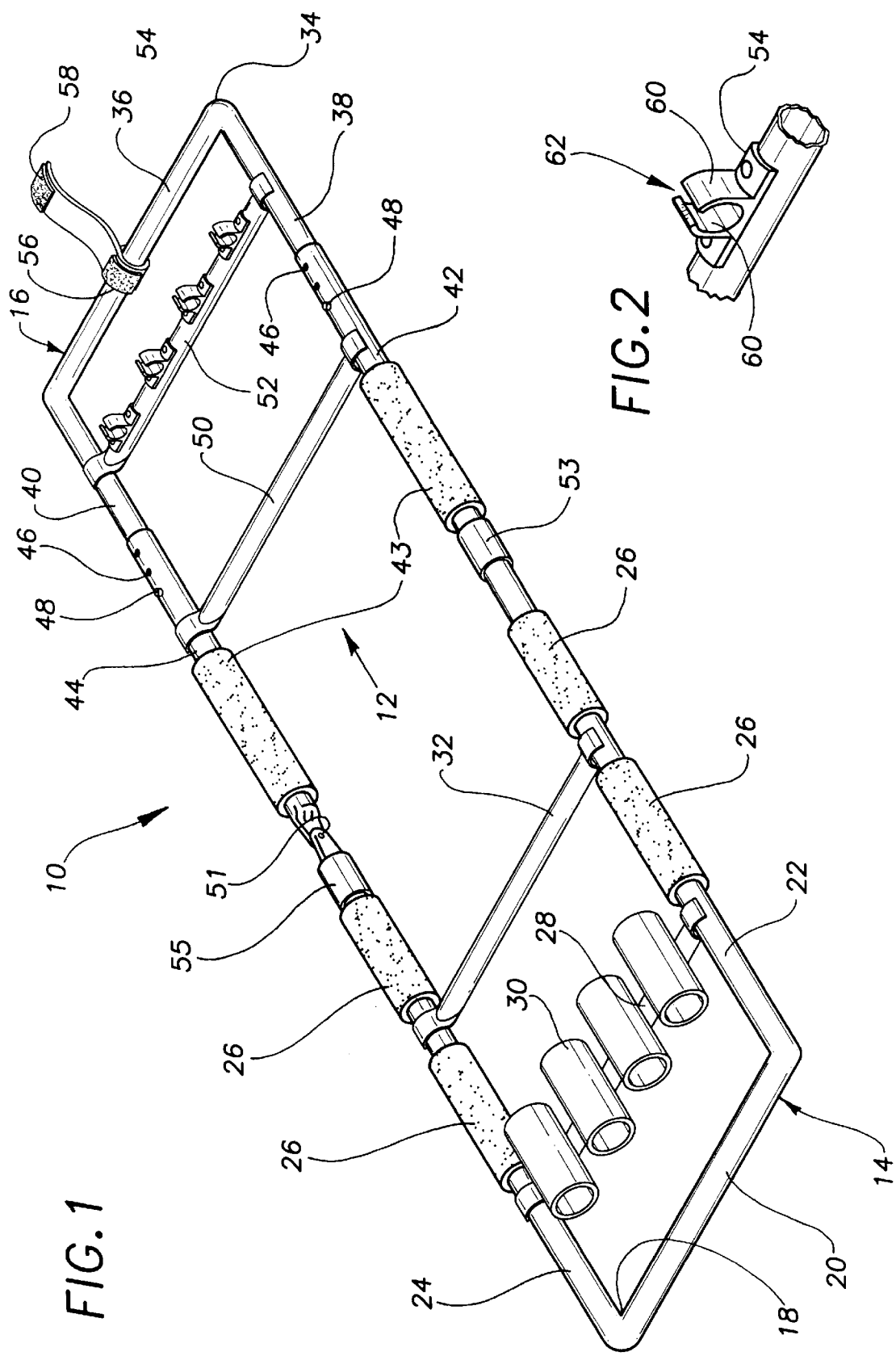

ROD AND REEL CADDY

TECHNICAL FIELD

The present invention relates to devices for storing and transporting items and more particularly to a rod and reel caddy for storing and carrying fully rigged fishing rod and reel combinations including a folding frame structure including a first U-shaped assembly having a heel bar having a plurality of rod heel receiving tubes, and a second U-shaped assembly having a pair of adjustable length parallel bars and a rod gripping bar attached between and perpendicular to the adjustable length parallel bars, the rod gripping bar having a plurality of rod gripping units secured along the length thereof for gripping the tip end of a fishing rod, the first and second U-shaped assemblies being pivotally connected by a pair of pivot pins and lockable in a fixed position with respect to one another by a pair of tubular locking members slidable over each of the pivot connections formed by the pair of pivot pins.

BACKGROUND OF THE INVENTION

Transporting and storing a number of fully rigged fishing rods can be difficult. It would be a benefit, therefore, to have a caddy to which a number of fully rigged fishing rods could be attached that would maintain the fishing rods in an organized and accessible fashion when transporting or storing the fishing rods. Because many boats have limited space, it would be a further benefit to have a fishing rod caddy that could be collapsed into a smaller unit for storage when the fishing rods were in use.

SUMMARY OF THE INVENTION

It is thus an object of the invention to provide a rod and reel caddy that can hold a number of fully rigged fishing rods.

It is a further object of the invention to provide a rod and reel caddy that can be collapsed into a smaller unit for storage when the fishing rods are in use.

It is a still further object of the invention to provide a rod and reel caddy that includes a folding frame structure having a first U-shaped assembly having a heel bar having a plurality of rod heel receiving tubes and a second U-shaped assembly having a pair of adjustable length parallel bars and a rod gripping bar attached between and perpendicular to the adjustable length parallel bars, the rod gripping bar having a plurality of rod gripping units secured along the length thereof for gripping the tip end of a fishing rod, the first and second U-shaped assemblies being pivotally connected by a pair of pivot pins and lockable in a fixed position with respect to one another by a pair of tubular locking members slidable over each of the pivot connections formed by the pair of pivot pins.

It is a still further object of the invention to provide a rod and reel caddy that accomplishes all or some of the above objects in combination.

Accordingly, a fishing rod and reel caddy is provided. The fishing rod and reel caddy includes a folding frame structure including a first U-shaped assembly and a second U-shaped assembly pivotally connected to the first U-shaped assembly. The first U-shaped assembly has a first central bar having a first pair of parallel bars extending from the ends thereof. A heel attachment bar having a plurality of rod heel receiving tubes is connected between the two parallel bars. The second U-shaped assembly has a second central bar having a second pair of parallel bars extending from the ends thereof. Each of the second pair of parallel bars includes a length adjustment mechanism for allowing a user to adjust the lengths thereof. A rod gripping bar is attached between and perpendicular to the second pair of adjustable length parallel bars. The rod gripping bar has a plurality of rod gripping units secured along the length thereof for gripping the tip end of a fishing rod. The first and second U-shaped assemblies are pivotally connected by a pair of pivot pins at the far ends of the first and second pairs of parallel bars. The first and second U-shaped assemblies are lockable in a fixed position with respect to one another by a pair of tubular locking members slidable over each of the pivot connections formed by the pair of pivot pins.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein:

FIG. 1 is a perspective view of an exemplary embodiment of the fishing rod and reel caddy of the present invention showing the folding frame structure including the first U-shaped assembly, the first central bar, the first pair of parallel bars, the heel attachment bar, the rod heel receiving tubes, the second U-shaped assembly, the second central bar, the second pair of parallel bars, the first length adjustment mechanism, the second length adjustment mechanism, the length adjustment locking pins, the rod gripping bar, the rod gripping units, the second pivot pin, and the first and second slidable, tubular locking members.

FIG. 2 is a detail perspective view of one of the rod gripping units in isolation.

DESCRIPTION OF THE EXEMPLARY EMBODIMENT

Figure 3:
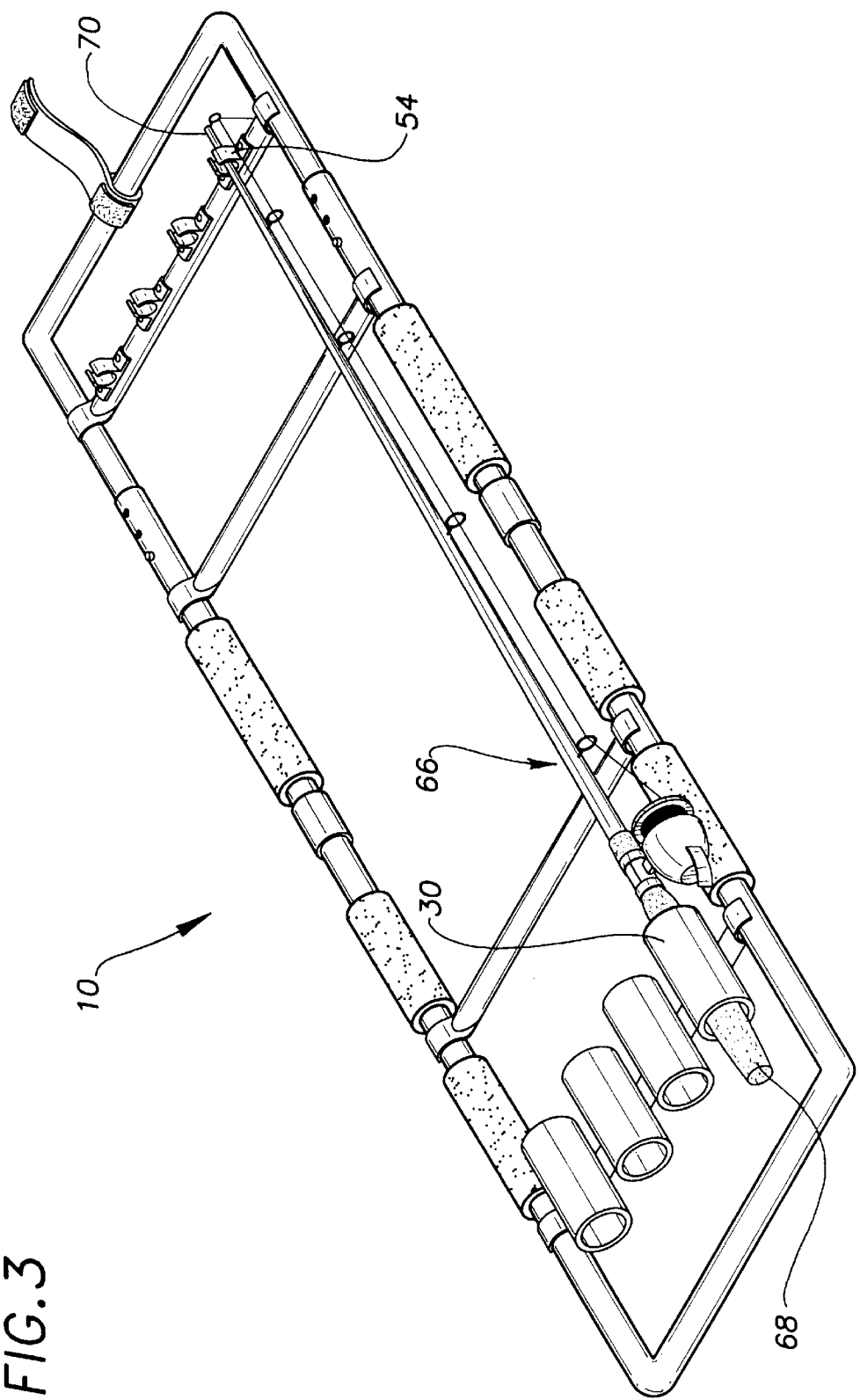
FIG. 3 is a perspective view of the fishing rod and reel caddy of FIG. 1 showing a representative fishing rod and reel assembly with the heel of the fishing rod positioned within one of the rod heel receiving tubes and the tip of the fishing rod positioned between the gripping members of one of the rod gripping units.

FIG. 1 shows an exemplary embodiment of the fishing rod and reel caddy of the present invention generally designated by the numeral 10. Rod and reel caddy 10 includes a folding frame structure generally designated by the numeral 12 including a first U-shaped assembly, generally designated by the numeral 14, and a second U-shaped assembly, generally designated by the numeral 16.

First U-shaped assembly includes a first U-shaped structure 18 integrally formed from a length of aluminum tubing that includes a first central bar 20 and a first pair of parallel bars 22,24. Two tubular foam cushion sections 26 are positioned over each parallel bar 22, 24. A heel attachment bar 28 constructed from a length of aluminum tubing is attached between parallel bars 22,24 by rivets. In this embodiment, four rod heel receiving tubes 30 are secured along heel attachment bar 28. Rod heel receiving tubes 30 are lengths of plastic pipe. A cross-brace 32 is constructed from a length of aluminum tubing and is attached between parallel bars 22,24 by rivets to prevent twisting of parallel bars 22,24.

Figure 4:
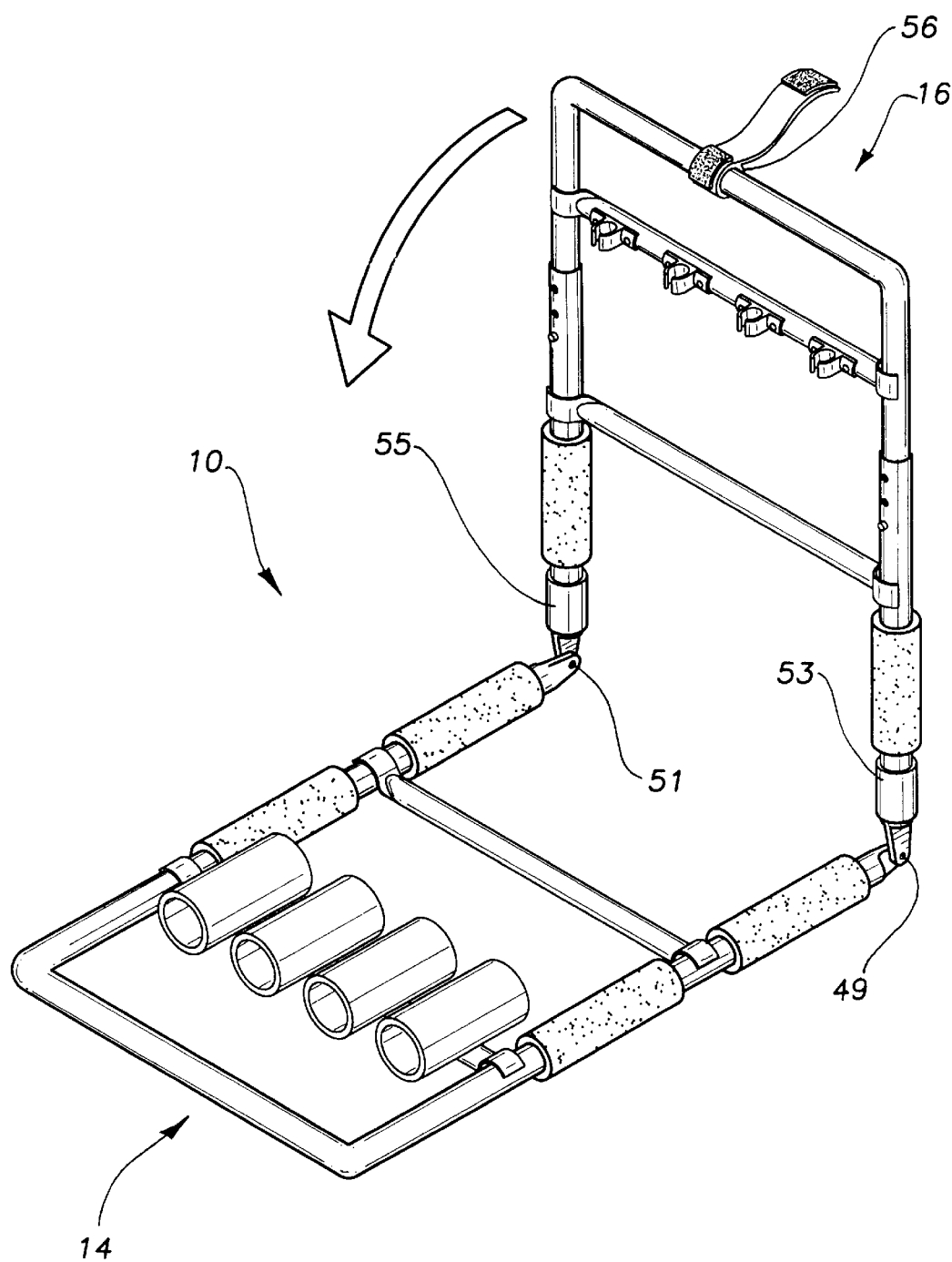
FIG. 4 is a perspective view of the fishing rod and reel caddy of FIG. 1 showing the first and second U-shaped assemblies pivoted midway into the closed storage configuration.

Second U-shaped assembly 16 includes a second U-shaped structure 34 including a second central bar 36 and a second pair 38,40 of parallel bars. Each parallel bar 38,40 includes an extension bar 42,44, respectively, that is slidably positionable over an end of a parallel bar 38,40. Extension bars 42,44 each have a number of locking pin apertures 46 into which a spring loaded locking pin 48 provided on the end of each parallel bar 38,40 is positioned to lock extension bars 42,44 with respect to parallel bars 38,40. Extension bars 42,44 are secured together by a cross-bar 50 riveted therebetween. Extension bar 42 is pivotally connected to parallel bar 22 by a pivot pin 49 (FIG. 4). Extension bar 44 is pivotally connected to parallel bar 24 by a pivot pin 51. A first tubular shaped, slidable locking tube 53 is provided for locking extension bar 42 and parallel bar 22 in a fixed relationship. A second tubular shaped, slidable locking tube 55 is provided for locking extension bar 44 and parallel bar 24 in a fixed relationship. Each extension bar 44,42 is covered with a section of resilient foam tubing 43.

A securing strap 56 is secured about second central bar 36. In use, a free end 58 of securing strap 56 is wrapped and secured about first central bar 20 to hold first and second U-shaped assemblies 14,16 together for storage. A rod gripping bar 52 is riveted between and perpendicular to parallel bars 38,40. Rod gripping bar 52 has a plurality of rod gripping units 54 secured along the length thereof for gripping the tip end of a fishing rod. With reference to FIG. 2, each rod gripping unit 54 is molded from resilient plastic and includes a pair of gripping fingers 60 that define a rod tip receiving cavity 62. In use, gripping fingers 60 resiliently grip a rod tip inserted into rod tip receiving cavity 62.

Referring now to FIG. 3, in use a fully rigged fishing rod 66 is secured to rod and reel caddy 10 by inserting a heel end 68 into and through one of the rod heel receiving tubes 30 and a rod tip end 70 into a rod tip receiving cavity 62 (FIG. 2) of a rod gripping unit 54. If necessary, the length of rod and reel caddy 10 can be adjusted as previously described. With reference to FIG. 4, after fishing rod 66 (FIG. 3) has been removed from rod and reel caddy 10, slidable locking tubes 53,55 are moved away from pivot pins 49,51 and first and second U-shaped assemblies 14,16 pivoted together and secured in place by securing strap 56 for storage.

It can be seen from the preceding description that a fishing rod and reel caddy has been provided that can hold a number of fully rigged fishing rods; that can be collapsed into a smaller unit for storage when the fishing rods are in use; and that includes a folding frame structure having a first U-shaped assembly having a heel bar having a plurality of rod heel receiving tubes and a second U-shaped assembly having a pair of adjustable length parallel bars and a rod gripping bar attached between and perpendicular to the adjustable length parallel bars, the rod gripping bar having a plurality of rod gripping units secured along the length thereof for gripping the tip end of a fishing rod, the first and second U-shaped assemblies being pivotally connected by a pair of pivot pins and being lockable in a fixed position with respect to one another by a pair of tubular locking members slidable over each of the pivot connections formed by the pair of pivot pins.

It is noted that the embodiment of the rod and reel caddy described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A rod and reel caddy comprising:

a folding frame structure including:

a first U-shaped assembly having a first central bar, a first pair of parallel bars extending from ends of said first central bar in a manner to form a U-shaped structure, a heel attachment bar connected between said first pair of parallel bars, and a plurality of rod heel receiving tubes attached and spaced along said heel attachment bar; and a second U-shaped assembly having a second central bar, a second pair of parallel bars extending from ends of said second central bar in a manner to form a U-shaped structure, each of said second pair of parallel bars being adjustable in length, at least one of said second pair of parallel bars including a length locking mechanism for allowing a user to lock said second pair of parallel bars at a desired length, a rod gripping bar attached between and perpendicular to said second pair of parallel bars, and a plurality of rod gripping units secured along said rod gripping bar;

said first and second U-shaped assemblies being pivotally connected by a pair of pivot pins inserted through far ends of said first and second pairs of parallel bars, said first and second U-shaped assemblies being lockable in a fixed position with respect to one another by a pair of tubular locking members, each tubular locking member being slidable over one each of a pair of pivot connections formed by said pair of pivot pins.

2. The rod and reel caddy of claim 1, wherein:

said first central bar and said first pair of parallel bars are integrally formed from a single length of tubing; and said second central bar and said second pair of parallel bars are integrally formed from a single length of tubing.

3. The rod and reel caddy of claim 2, wherein:

each of said second pair of parallel bars has an extension bar slidably positioned over a parallel bar end thereof.

4. The rod and reel caddy of claim 3 wherein:

each of said second pair of parallel bars has a spring loaded locking pin provided within a said parallel bar end thereof, and each of said extension bars has a plurality of locking pin apertures formed therethrough and sized to receive a pin end of said spring loaded locking pin.

5. The rod and reel caddy of claim 4 wherein:

said folding frame structure further includes a securing strap securable between said first and second U-shaped assemblies.

6. The rod and reel caddy of claim 5 wherein:

each of said plurality of rod gripping units is molded from a resilient plastic and includes a pair of gripping fingers that define a rod tip receiving cavity.

7. The rod and reel caddy of claim 4 wherein:

each of said plurality of rod gripping units is molded from a resilient plastic and includes a pair of gripping fingers that define a rod tip receiving cavity.

8. The rod and reel caddy of claim 2 wherein:

said folding frame structure further includes a securing strap securable between said first and second U-shaped assemblies.

9. The rod and reel caddy of claim 8 wherein:

each of said plurality of rod gripping units is molded from a resilient plastic and includes a pair of gripping fingers that define a rod tip receiving cavity.

10. The rod and reel caddy of claim 2 wherein:

each of said plurality of rod gripping units is molded from a resilient plastic and includes a pair of gripping fingers that define a rod tip receiving cavity.

11. The rod and reel caddy of claim 1, wherein:

each of said second pair of parallel bars has an extension bar slidably positioned over a parallel bar end thereof.

12. The rod and reel caddy of claim 11 wherein:

each of said second pair of parallel bars has a spring loaded locking pin provided within a said parallel bar end thereof, and each of said extension bars has a plurality of locking pin apertures formed therethrough and sized to receive a pin end of said spring loaded locking pin.

13. The rod and reel caddy of claim 11 wherein:

said folding frame structure further includes a securing strap securable between said first and second U-shaped assemblies.

14. The rod and reel caddy of claim 11 wherein:

each of said plurality of rod gripping units is molded from a resilient plastic and includes a pair of gripping fingers that define a rod tip receiving cavity.

15. The rod and reel caddy of claim 11 wherein:

said folding frame structure further includes a securing strap securable between said first and second U-shaped assemblies.

16. The rod and reel caddy of claim 15 wherein:

each of said plurality of rod gripping units is molded from a resilient plastic and includes a pair of gripping fingers that define a rod tip receiving cavity.

17. The rod and reel caddy of claim 11 wherein:

each of said plurality of rod gripping units is molded from a resilient plastic and includes a pair of gripping fingers that define a rod tip receiving cavity.

18. The rod and reel caddy of claim 1 wherein:

said folding frame structure further includes a securing strap securable between said first and second U-shaped assemblies.

19. The rod and reel caddy of claim 18 wherein:

each of said plurality of rod gripping units is molded from a resilient plastic and includes a pair of gripping fingers that define a rod tip receiving cavity.

20. The rod and reel caddy of claim 1 wherein:

each of said plurality of rod gripping units is molded from a resilient plastic and includes a pair of gripping fingers that define a rod tip receiving cavity.

* * * * *